United States Patent
Lee (10) Patent No.: US 6,912,373 B2
(45) Date of Patent: Jun. 28, 2005

(54) BLUETOOTH PRIVATE NETWORK AND COMMUNICATION METHOD THEREOF

(75) Inventor: Hee Dong Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 905 days.

(21) Appl. No.: 09/898,830

(22) Filed: Jul. 3, 2001

(65) Prior Publication Data

US 2002/0045424 A1 Apr. 18, 2002

(30) Foreign Application Priority Data

Oct. 18, 2000 (KR) .......................................... 2000-61344

(51) Int. Cl.⁷ ............................ H04B 7/00; H04L 12/28; H04L 12/66; H04Q 7/20
(52) U.S. Cl. ........................ 455/41.2; 370/332; 370/338; 370/401; 455/426.1; 455/444; 455/522
(58) Field of Search ................................. 307/310, 328, 307/331, 332, 338, 401, 402, 403, 911, 913; 455/41.2, 41.3, 426.1, 436, 444, 522

(56) References Cited

U.S. PATENT DOCUMENTS

| | | | | |
|---|---|---|---|---|
| 5,375,140 A | * | 12/1994 | Bustamante et al. | 375/142 |
| 5,577,168 A | * | 11/1996 | Haas et al. | 455/443 |
| 5,887,256 A | * | 3/1999 | Lu et al. | 455/426.1 |
| 5,995,835 A | * | 11/1999 | De Seze et al. | 455/436 |
| 6,804,221 B1 | * | 10/2004 | Magret et al. | 370/338 |
| 6,834,192 B1 | * | 12/2004 | Watanabe et al. | 455/444 |
| 2001/0041594 A1 | * | 11/2001 | Arazi et al. | 455/561 |
| 2002/0151302 A1 | * | 10/2002 | Schmidt et al. | 455/426 |
| 2003/0048770 A1 | * | 3/2003 | Proctor, Jr. | 370/349 |

* cited by examiner

*Primary Examiner*—Harry S. Hong
(74) *Attorney, Agent, or Firm*—Lee, Hong, Degerman, Kang & Schmadeka (57) ABSTRACT

A Bluetooth private network comprises Bluetooth access points, each functioning as a base station in each of Bluetooth piconets, a gateway for functioning as an interface between a public network and the Bluetooth private network, sending a beacon signal to each of the Bluetooth devices in local Bluetooth networks to locate the Bluetooth device and a router for functioning as an interface between each of said Bluetooth access points. The Bluetooth device has a power measuring device therein that measures output power signals of a plurality of Bluetooth access points. When the Bluetooth device is moving from one piconet to another, the Bluetooth device compares the power signals received from two Bluetooth access points and links to the Bluetooth access point with the power signal that exceeds a predetermined level.

21 Claims, 10 Drawing Sheets

BLUETOOTH PRIVATE NETWORK AND COMMUNICATION METHOD THEREOF

CROSS REFERENCE TO RELATED ART

This application claims the benefit of Korean Patent Application No. 2000-61344, filed on Oct. 18, 2000, which is hereby incorporated by reference in its entirety.

BACKGROUND OF THE INVENTION

1. Field of the Invention

The present invention relates to a Bluetooth private network and communication method thereof, and particularly to a Bluetooth private network with a handoff function to enable a Bluetooth device to be used with multiple Bluetooth access points without interruption.

2. Discussion of the Related Art

First, hereinafter description will be made about Bluetooth. In order to solve the problem that too many connecting cables are required for the connection among movable devices, Bluetooth was developed on February 1998 under the cooperation of movable telecommunication providers and computer manufacturers including Ericsson, Nokia, Intel, IBM and Toshiba. Bluetooth is a new radio telecommunication technology based upon low cost, low electric power radio communication and aims for replacing cables, and realized into a chip-type solution since it can be installed in various kinds of portable devices.

Bluetooth allows direct radio communication among devices without passing through a remote base station when inter-device data transmission is required at home or office so that data can be freely transmitted at high speeds without any standby time, while causing no communication load to the base station. Also, the inconvenience that an average consumer should connect and maintain communication cables one by one in the house is solved, and integration is promoted among information devices, such as a computer, and communication devices, such as a telephone.

Bluetooth has the following features. Frequency is 2.4 GHz ISM (Industrial, Scientific and Medical) band for allowing realization with relative ease and low price, and the distance of transmission is 10 meters. The transmission distance is determined 10 meters based upon the judgement that 10 meters is sufficient for the transmission between a portable device of a user and a device installed on a desk in the office. Time division is adopted as a multiplexing to lower price, and three synchronous channels and one asynchronous channel are provided. For communication, Gaussian filtered FSK (GFSK) is used as a modulation mode, circuit and packet switch is employed, and a pico cell is formed.

Figure 1:
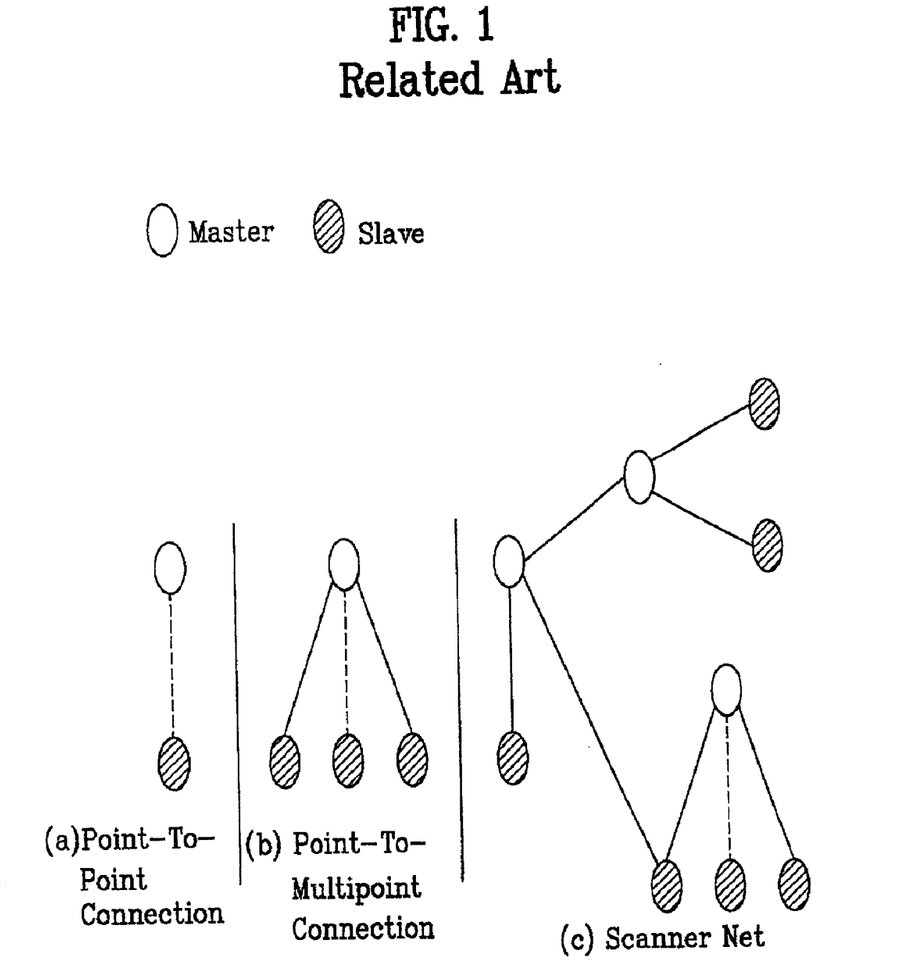
FIG. 1 shows a connecting method via a Bluetooth system.

FIG. 1 shows a connecting method via a Bluetooth system. As shown in FIG. 1, the connecting method includes a point-to-point connection and a point-to-multipoint connection. A master should be discriminated from a slave in Bluetooth, in which the master orders a command and the slave receives and performs the command. According to Bluetooth, the slave can communicate only with its master, and should pass by the master for the communication with other slaves. Bluetooth allows seven active channels, in which the master can be connected with up to seven active slaves.

However, even in Bluetooth, the connection is interrupted during movement from one piconet to another piconet, incurring packet loss. Support for mobility and handoff is required to solve this problem, whereas, at the present, Bluetooth does not provide such mobility.

SUMMARY OF THE INVENTION

The present invention has been proposed to solve the above problems of the related art, and it is therefore an object of the present invention to provide a private network for supporting a handoff and enhancing mobility of a Bluetooth device and a communication method thereof.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

According to an embodiment of the invention to obtain the object, it is provided a Bluetooth private network, comprising: Bluetooth access points for functioning as a base station in each of the Bluetooth piconets and an interface between a signal transmitted from an external network and Bluetooth devices within each of the Bluetooth piconets; a gateway for functioning as an interface between a public network and a Bluetooth network, sending a beacon signal to each of the Bluetooth devices in local Bluetooth networks to locate the Bluetooth device, and communicating with a home agent of each of the Bluetooth devices to perform authentication of each of the Bluetooth devices; the Bluetooth device having a power measuring device therein that measures output power signals of a plurality of Bluetooth access points; and a router for functioning as an interface between each of the Bluetooth access points.

According to the present invention, there is provided a communication method in a Bluetooth private network, comprising the following steps: (a) transmitting from a gateway a beacon signal to a Bluetooth device in a local Bluetooth network for confirming a piconet to which the Bluetooth device belongs; (b) upon receiving the beacon signal, transmitting from the Bluetooth device a route update packet to the gateway to set a communication path with the gateway after understanding a path of the beacon; (c) transmitting from the Bluetooth device a home IP address and a home agent address to the gateway; (d) upon receiving a registration request signal in step (c), allocating from the gateway an address to the Bluetooth device to use the address in the piconet to which the Bluetooth device currently belongs; (e) requesting from the Bluetooth registration to the gateway with the address transmitted in step (d) and performing registration in the gateway; and (f) when registered in step (e), communicating from the Bluetooth device with other communication devices in other networks through the path set in step (b).

It is to be understood that both the foregoing general description and the following detailed description are exemplary and explanatory and are intended to provide a further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

A private network of the invention is designed with a mobile Internet protocol technology and a cellular Internet protocol technology in association with Bluetooth. A private network via a general mobile Internet protocol and another private network via a cellular Internet protocol will first be described.

Figure 2:
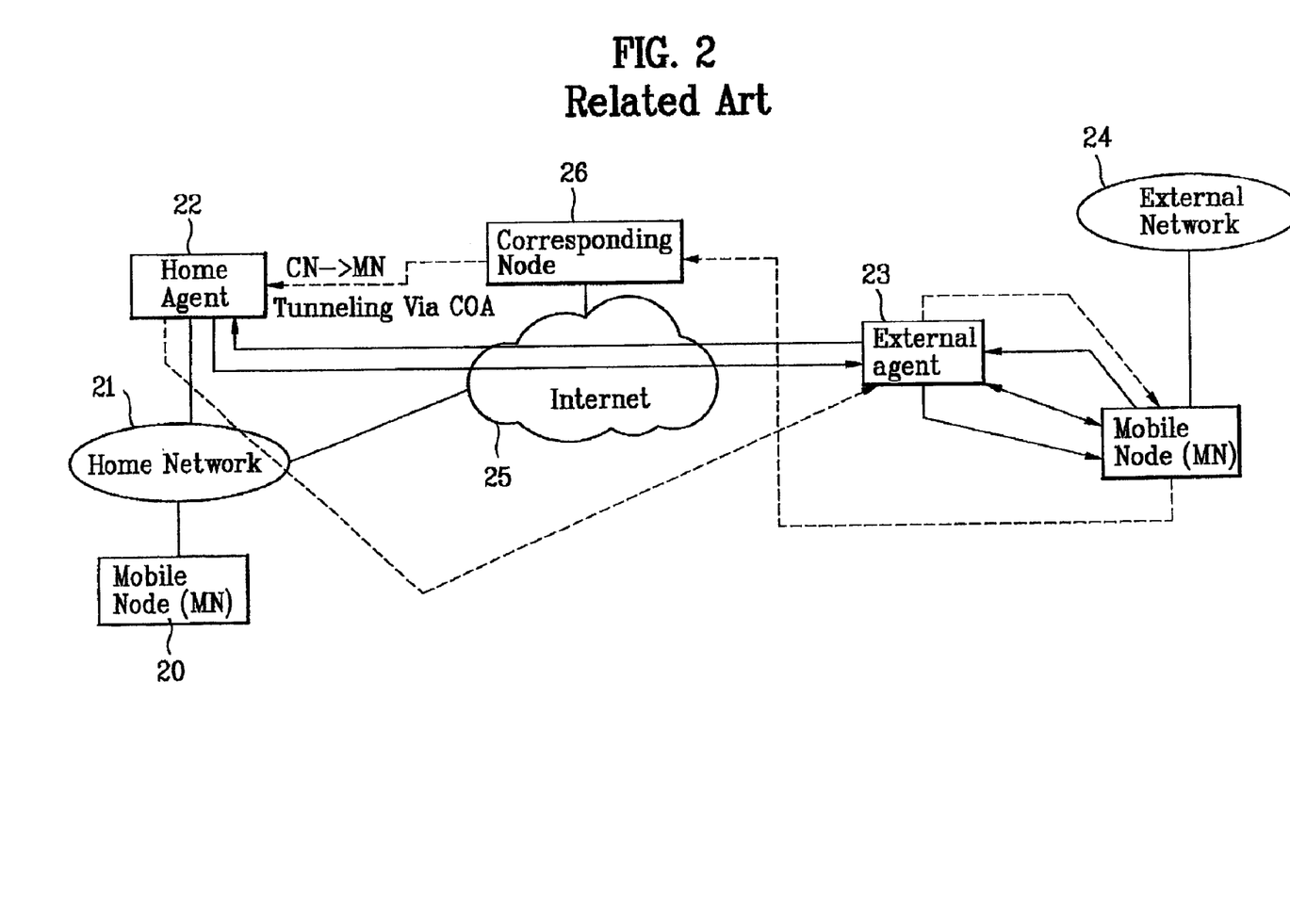
FIG. 2 shows a mobile Internet protocol private network.

FIG. 2 shows a structure of a private network via a mobile Internet protocol. As shown in FIG. 2, the private network via the mobile Internet protocol is comprised of a mobile node 20 which is a communication device, a home agent 22 having the mobile node 20 registered therein, a home network 21 managed by the home agent 22, an external network 24 in which the mobile node 20 is currently positioned and an external agent 23 for managing the external network 24.

The private network via the Internet protocol allows the mobile node, such as a notebook computer, to be used while maintaining the unique IP address even in other networks via the Internet, in which a number of services supported by the home network can be supported even by the external network. A communication method in the private network via the mobile Internet protocol will be described in reference to FIG. 2 as follows.

In FIG. 2, the home network 21 is a network in which the mobile node 20, for example a notebook computer, is registered, and generally the mobile node 20 communicates in the home network via the Internet 25. The home agent 22 performs a similar role to a Home Location Register (HLR) in a mobile communication service and has mobile nodes in the home network registered therein. According to the preferred embodiment of the invention, the home agent 22 is provided as a router.

During movement to the external network 24, the mobile node 20 transmits a signal notifying the movement in the network to the external agent 23 of the external network 24. Such a message is called an agent advertisement message or an agent solicitation message in the mobile Internet protocol.

Through the agent advertisement message and the agent solicitation message, the mobile node 20 notifies the external agent 23 of the access thereof into the network managed by the external agent 23, and transmits the IP address of the mobile node and the home agent address to the external agent 23. Upon receiving the IP address and the home agent address from the mobile node, the external agent 23 allocates the mobile node with an address to be used in the external network. In the mobile Internet protocol, such an address is called a Care Of Address (hereinafter will be referred to as "COA").

Upon being allocated with the COA, the mobile node requests registration of the external agent for communication in the external network 24. Upon requested with registration, the external agent transmits the COA, which was previously allocated to the mobile node, to the home agent 22 of the mobile node connected via the Internet 25 and notifies the request for registration. The external agent 23 uses the home IP address and home agent address received from the mobile node for transmitting the COA and a message related to the registration request to the home agent 22. Upon receiving such information, the home agent 22 transmits a registration permission message to the external agent 23, which then sends the message to the mobile node 20. Through the above process, the mobile node completes authentication in the external network 24, and can communicate in the external network 24.

A description will be made hereinafter about a communication method of the mobile node communicating with a corresponding node 26 as a communication counterpart thereof after the completion of authentication. When the mobile node 20 transmits a message to the corresponding node 26, the external agent 23 performs routing, and the transmitted message is transmitted to the corresponding node 26 via the Internet 25 from the external agent 23.

Since the corresponding node 26 is not notified of the movement of the mobile node, a message from the corresponding node to the mobile node is primarily transmitted to the home agent 22 of the mobile node. The home agent 22 transmits the message from the corresponding node to the external agent 23 through tunneling because the home agent 22 has information concerning the COA of the mobile node and the network to which the mobile node belongs. Then, the mobile node receives the message from the corresponding node 26.

While the description has been provided above concerning the private network via the mobile Internet protocol employed in the present invention, the following will be a description about a network via a cellular Internet protocol.

Figure 3:
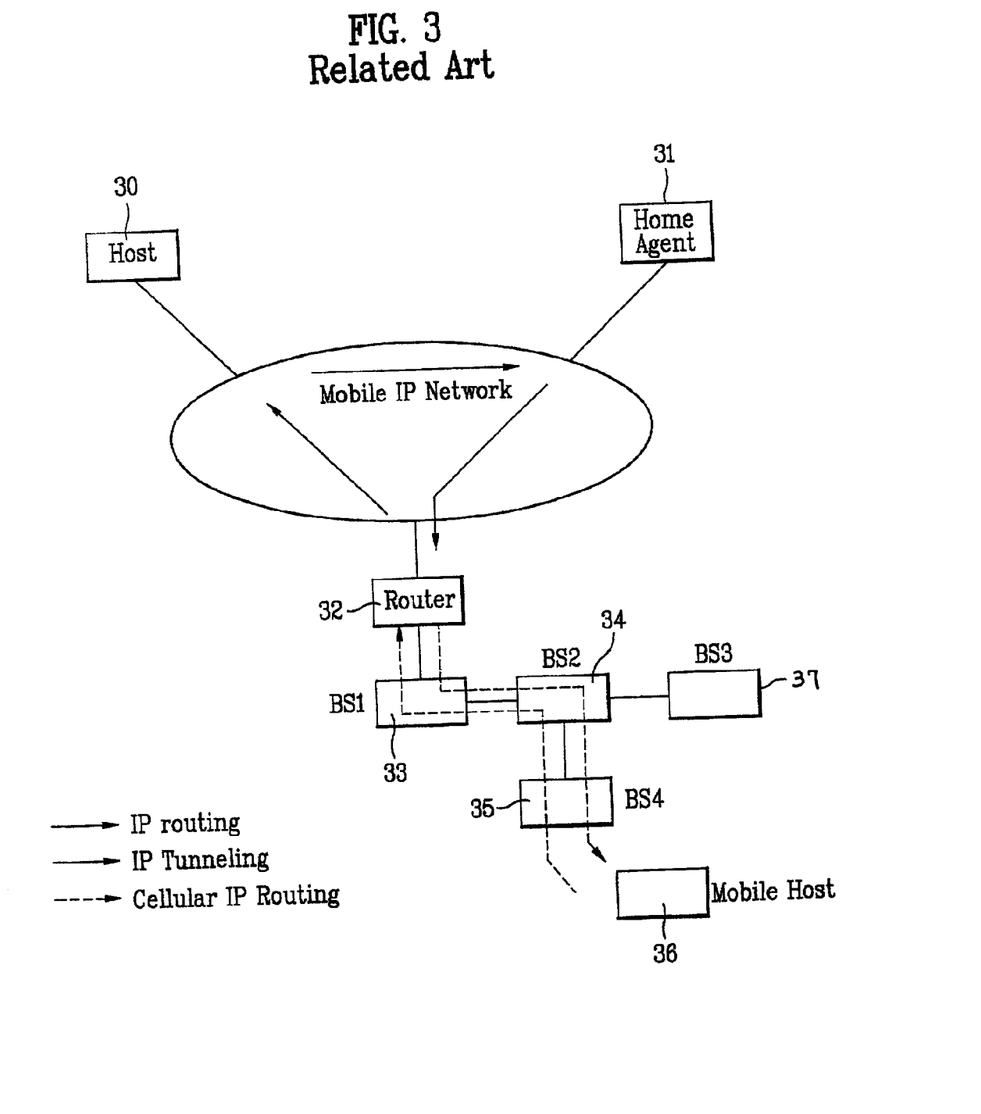
FIG. 3 shows a cellular Internet protocol private network.

FIG. 3 shows a network structure via a cellular Internet protocol. As shown in FIG. 3, the private network via the cellular Internet protocol is comprised of a plurality of base stations 33, 34 and 35, a home agent 31, a mobile host 36 which is a communication device (e.g., a cellular phone) and a router 32 for functioning as an external agent in the mobile Internet protocol shown in FIG. 2.

The network via the mobile Internet protocol supports the communication in an outer network beyond a home network, but does not support a handoff in moving to another adjacent network beyond the network. Therefore, in the network via the mobile Internet protocol, when the movement is made to another network, the communication can be made only after terminating the current communication and performing a registration procedure in the new network. The network via the cellular Internet protocol compensates such a disadvantage to support the handoff so that the communication may not be terminated during the movement.

The communication process in the network via the cellular Internet protocol will be described in reference to FIG. 3 as follows. In FIG. 3, the router 32 performs a role similar to an external agent and functions as an interface for connecting several base stations. The router periodically sends a beacon signal to the mobile host 36 to determine a base station where the mobile host 36 presently belongs.

While the mobile host 36 can directly receive the beacon signal from the router 32 if it belongs to a base station BS1

33, if it belongs to a base station BS4 35 as shown in FIG. 3, the mobile host receives the beacon signal via the base station BS1 33 and a base station BS2 34. Upon receiving the beacon signal, the mobile host 36 transmits a route update packet to the router 32 for setting a communication route. The route update packet is transmitted from the mobile host 36 to the router 32 through the fastest path.

In FIG. 3, the route update packet is transmitted from the base station BS4 35, where the mobile host 36 belongs, via the base station BS2 34 and the base station BS1 33 to the router 32, and a communication path is set along the path through which the route update packet is transmitted. Each of the base stations has a cache memory and stores the transmission path of the route update packet. The cache memory is updated when a new route update packet is received. When the communication path is set via the route update packet transmission, the communication can be performed with other communication devices of the outer network through the set path.

A handoff method in the network via the cellular Internet protocol will be described as follows. A description will be made in a situation in which the mobile host 36 present in the base station BS4 35 moves to a base station BS3 37 as an example.

Since the router 32 periodically transmits a beacon signal to the mobile host 36, the mobile host 36 receives two beacon signals from two base stations while passing the interface between the base stations. In this case, the mobile host 36 prepares for the handoff from the present base station BS4 35 to the base station BS3 37 in the moving direction. During the handoff, the data packet is transmitted to a communication device communicating with the mobile host 36, which is continuously transmitted through the base station BS4 35. At the same time, the route update packet is transmitted to the router 32 through the base station BS3 37 and a communication path is set for the new base station BS3 37. During the transmission of a new route update packet, the cache in each base station is updated. When the mobile host moves to the base station BS3 37 and the communication path is set, the handoff is carried out for transmitting a data packet through the base station BS3 37.

While hereinbefore the description has been made to the private networks via the mobile Internet protocol and the cellular Internet protocol, the following will be a description about a Bluetooth network according to the preferred embodiment of the present invention.

Figure 4:
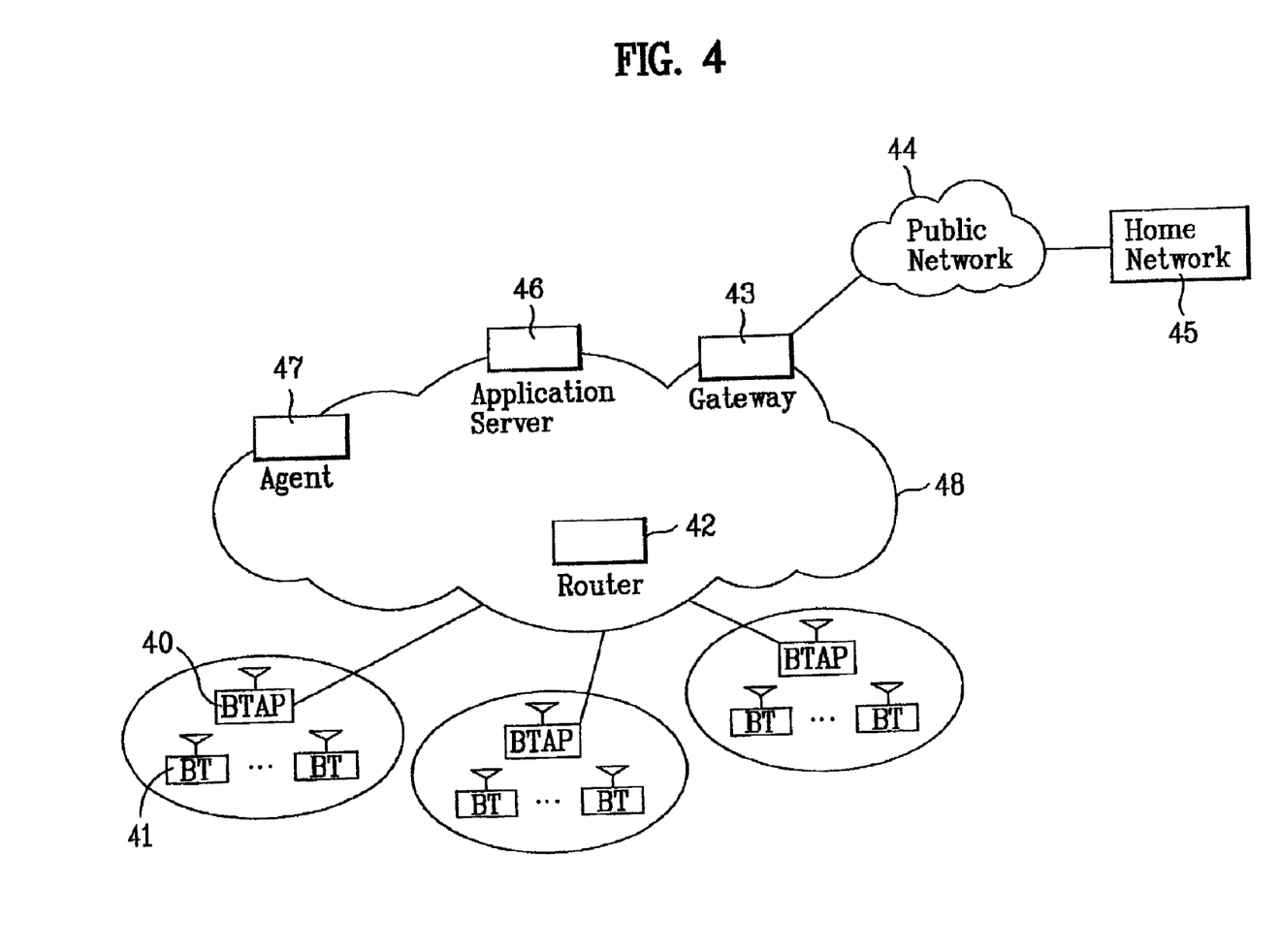
FIG. 4 shows a Bluetooth private network structure according to a preferred embodiment of the invention.
Figure 5:
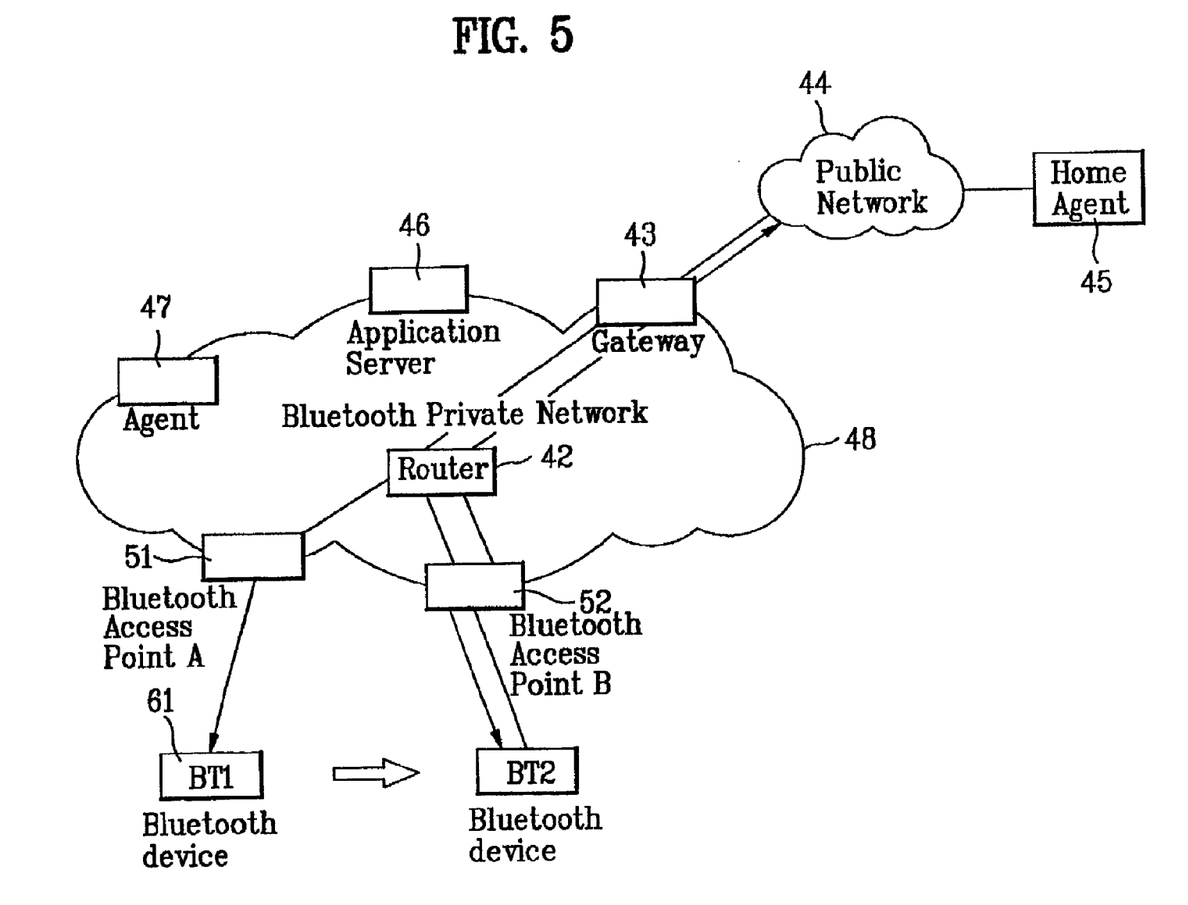
FIG. 5 shows a handoff in the Bluetooth private network.

FIG. 4 shows a network structure via Bluetooth according to a preferred embodiment of the invention. FIG. 5 shows a handoff in the network of the invention, and FIG. 6 shows a flow chart of a communication method in the network via Bluetooth according to the preferred embodiment of the invention.

Figure 6:
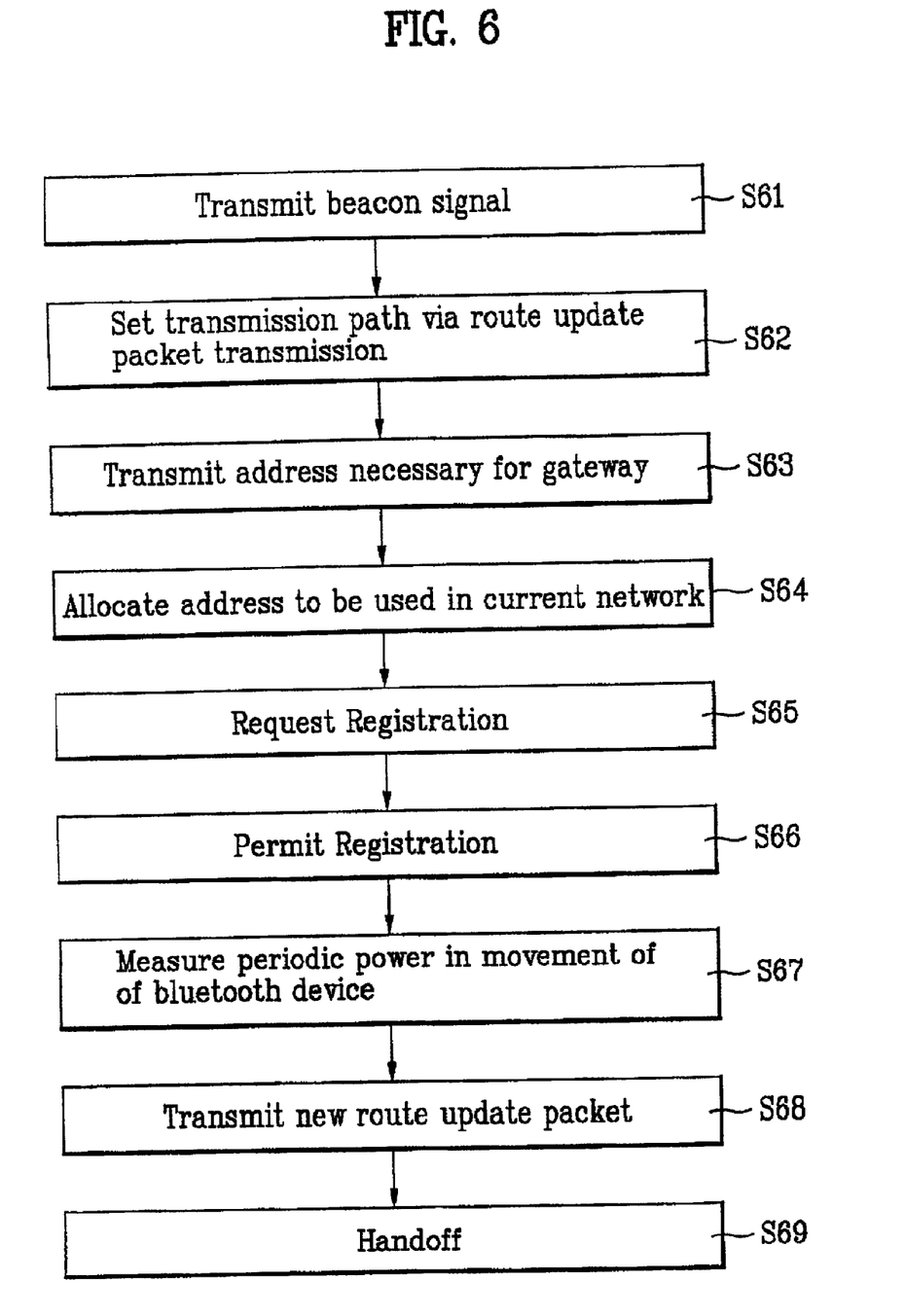
FIG. 6 shows a flow chart of a communication method in the Bluetooth private network according to the preferred embodiment of the invention.

Referring to FIG. 4 through FIG. 6, the Bluetooth private network according to the present invention will be described in detail. As shown in FIG. 4, the Bluetooth private network is comprised of Bluetooth access points 40 for functioning as base stations in local Bluetooth networks or a Bluetooth private network 48, a router 42 for functioning as an interface between each of the Bluetooth access points, a gateway 43 for functioning as an external agent in a mobile Internet protocol, an agent 47 for registering an IP address of each Bluetooth device 41 and an application server 46 for performing a service of supplying information requested from a user.

Referring to FIG. 4, the Bluetooth private network 48 is a LAN to which the Bluetooth devices should gain access. The Bluetooth private network 48 may consist of several interconnected heterogeneous LANs.

The gateway 43 connects the Bluetooth private network 48 to a public network 44 providing access to global information and communication services. The Bluetooth device 41 is the end device of Bluetooth users, such as notebook, personal digital assistant, etc. The Bluetooth access points 40 is a Bluetooth private network 48 access point. Each Bluetooth access point 40 may serve one or more Bluetooth pico cells.

Each of the Bluetooth access points 40 functions as a base station in each Bluetooth piconet, and functions as a master in the Bluetooth network. Therefore, Bluetooth devices 41 in the Bluetooth piconets should always be in communication through the Bluetooth access points 40. Also, one Bluetooth device 41 should pass by its Bluetooth access point 40 for communicating with a communications device in another piconet, in which the Bluetooth access point serves as the interface between a Bluetooth radio section and the external network.

The gateway 43 performs as a switch among a number of Bluetooth access points 40 and functions as the external agent in the mobile Internet protocol. Also, The gateway 43 transmits a beacon signal for locating each Bluetooth device 40. Also, the gateway 43 functions as an interface with an external public network such as a PSTN (Public Switched Telephone Network) or ISDN (Integrated Service Digital Network), and performs a tunneling with a home agent 45 of a movable host having its own IP address for allowing communication with a counterpart connected in the public network.

According to the present invention, the router 42 which is connected to a number of Bluetooth access points serves as an interface between each of the Bluetooth access points 41. The application server 46 supplies necessary information, such as train arrival time requested from the user through each Bluetooth device 41.

The agent 47 allocates IP addresses to the Bluetooth devices 41, registers IP addresses of the Bluetooth devices 41 having their own IP addresses, and performs an authentication procedure.

A description about the communication method in the network according to the present invention will be followed in reference to FIGS. 5 and 6. In step S61, the gateway 43 transmits a beacon signal to each of the Bluetooth devices 61 to confirm the nearest Bluetooth access point to the current Bluetooth device.

In step S62, upon receiving the beacon signal, the Bluetooth device 61 transmits a route update packet for setting a communication path as in the cellular Internet protocol. Each Bluetooth access point 51 includes a routing cache, which is updated by the route update packet transmitted from the Bluetooth device 61.

After setting the communication path, the Bluetooth device 61 is registered to the network to which the Bluetooth device currently belongs. For registration, the Bluetooth device 61 transmits the home IP address and the home agent address to the gateway 43 as in the mobile Internet protocol in step S63. In step S64, the gateway 43 allocates to the Bluetooth device 61 an address for utilization in the currently belonging Bluetooth piconet.

In step S65, upon being allocated with the address to use in the currently belonging Bluetooth piconet, the Bluetooth device 61 transmits a registration request signal to the gateway 43, which transmits the registration request signal and the allocated address for use in the local network to the home agent 45 of the Bluetooth device 61 which requested the registration.

In step S66, upon receiving the registration request signal, the home agent 45 transmits a registration permission signal to the gateway 43, which sends the signal to the Bluetooth device 61 for completing the registration. When registered, the Bluetooth device communicates with other devices in the currently belonging local network along the path set in step S62.

When other devices communicate with the registered Bluetooth device 61, a signal is primarily transmitted to the home agent 45 of the registered Bluetooth device 61. The home agent tunnels the signal to the gateway 43, which sends the signal to the Bluetooth device 61 along the set path.

As shown in FIG. 5, a handoff process is performed when the Bluetooth device moves from a Bluetooth access point A 51 to another Bluetooth access point B 52.

According to an embodiment of the invention, the Bluetooth device may be equipped with two power measuring devices to detect Receiver Signal Strength Indicator (RSSI). One power measuring device measures power transmitted from the Bluetooth access point A 51 of the currently belonging Bluetooth piconet, and the other power measuring device measures power transmitted from the Bluetooth access point B 52 of the destination piconet. In step S67, values of the measured powers are compared to judge the movement between the network if any, and this power measurement is performed periodically. Alternatively, one power measuring device may be used in a time division manner (e.g., periodic measurements) to measure RSSIs received from multiple sources.

According to an embodiment of the invention, each Bluetooth device includes two Bluetooth chips. Before the handoff is completed after the movement of the network, the Bluetooth device 53 transmits the data packet to the Bluetooth access point A 51 by using one Bluetooth chip, and transmits a new route update signal to the Bluetooth access point B 52 by using the other Bluetooth chip for setting a communication path in the new network in step S68. When the route update signal is re-transmitted, the routing cache in the related Bluetooth access point is updated, and accordingly the new communication path is set. When the communication path is set, the handoff is completed, and the Bluetooth device transmits the data packet via the access point B 52.

Figure 7:
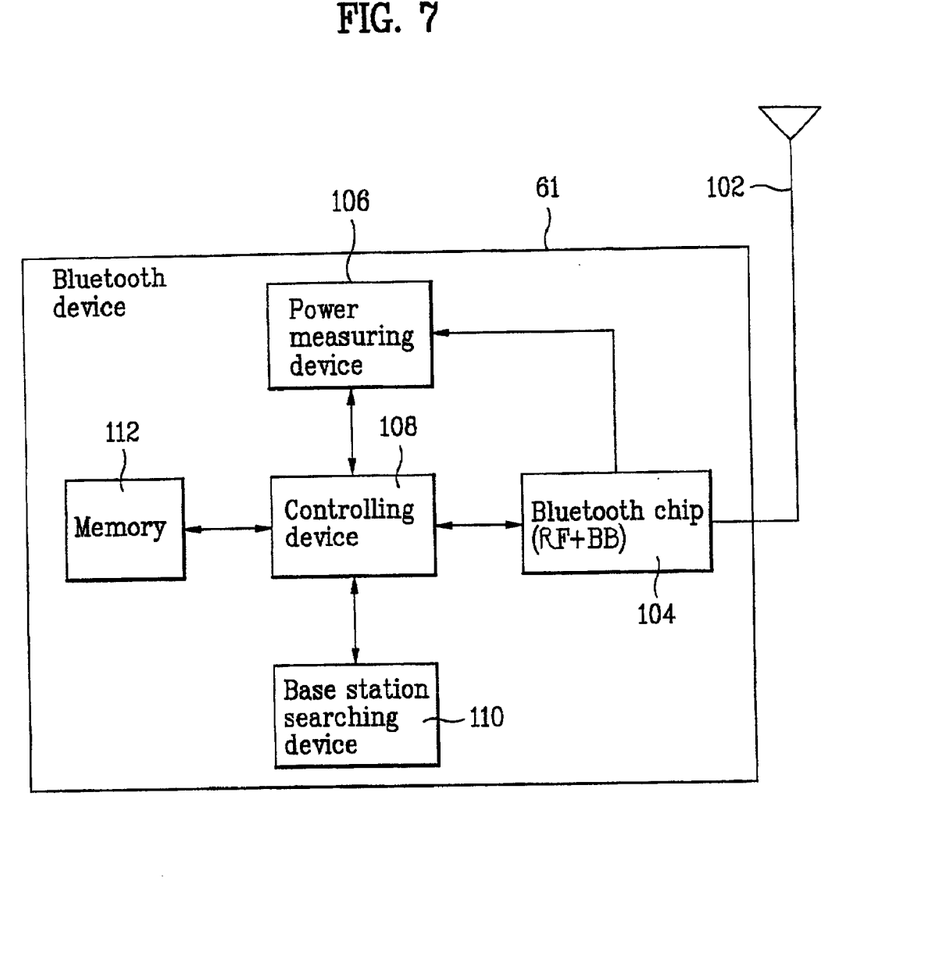
FIG. 7 illustrates a block diagram of the Bluetooth device used in the Bluetooth private network according to the preferred embodiment of the present invention.

FIG. 7 illustrate a block diagram of the Bluetooth device 61 according to the preferred embodiment of the present invention. Referring to FIG. 7, the Bluetooth device 61 comprises an antenna 102 connected to a Bluetooth chip 104. The Bluetooth chip 104 is connected to a power measuring device 106 and a controlling device 108 which is in communication with a base station searching device 110. The controlling device 108 is a central processing unit and is connected to a memory 112 for storing processing algorithms and operational programs.

According to the preferred embodiment, the Bluetooth chip 104 receives a beacon signal from a Bluetooth access point 51 through the antenna 102. The beacon signal contains a Receiver Signal Strength Indicator (RSSI). The Bluetooth chip 104 contains four RF channels, and thus is capable of receiving four RSSI from four different Bluetooth access points. The measurement of the RSSI is performed in the power measuring device 106. The received RSSIs are preferably stored in the memory 112 and are processed by the controlling device 108 to determine which RSSI contains the strongest power, thus enabling the Bluetooth device 61 to identify the nearest or the strongest Bluetooth acess point.

In particular, the Bluetooth device 61 uses Frequency Hopping Spread Spectrum (FHSS) which utilizes 79 channels. Of these channels, four channels are being used to detect RSSI from up to four different Bluetooth access point. In this regard, in order to allow the handoff capability, Bluetooth access point must transmit the RSSI information to Bluetooth devices.

Figure 8A:
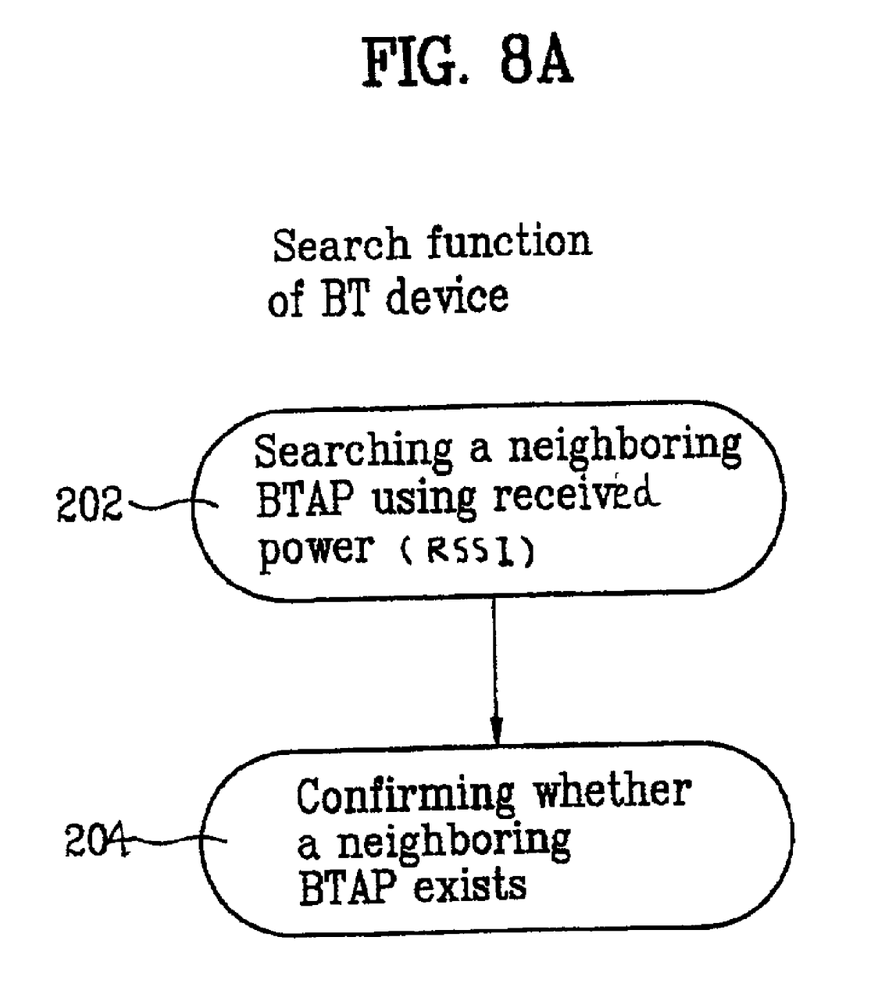
FIGS. 8A to 8C illustrate functional flow charts of the Bluetooth private network according to the preferred embodiment of the present invention.
Figure 8B:
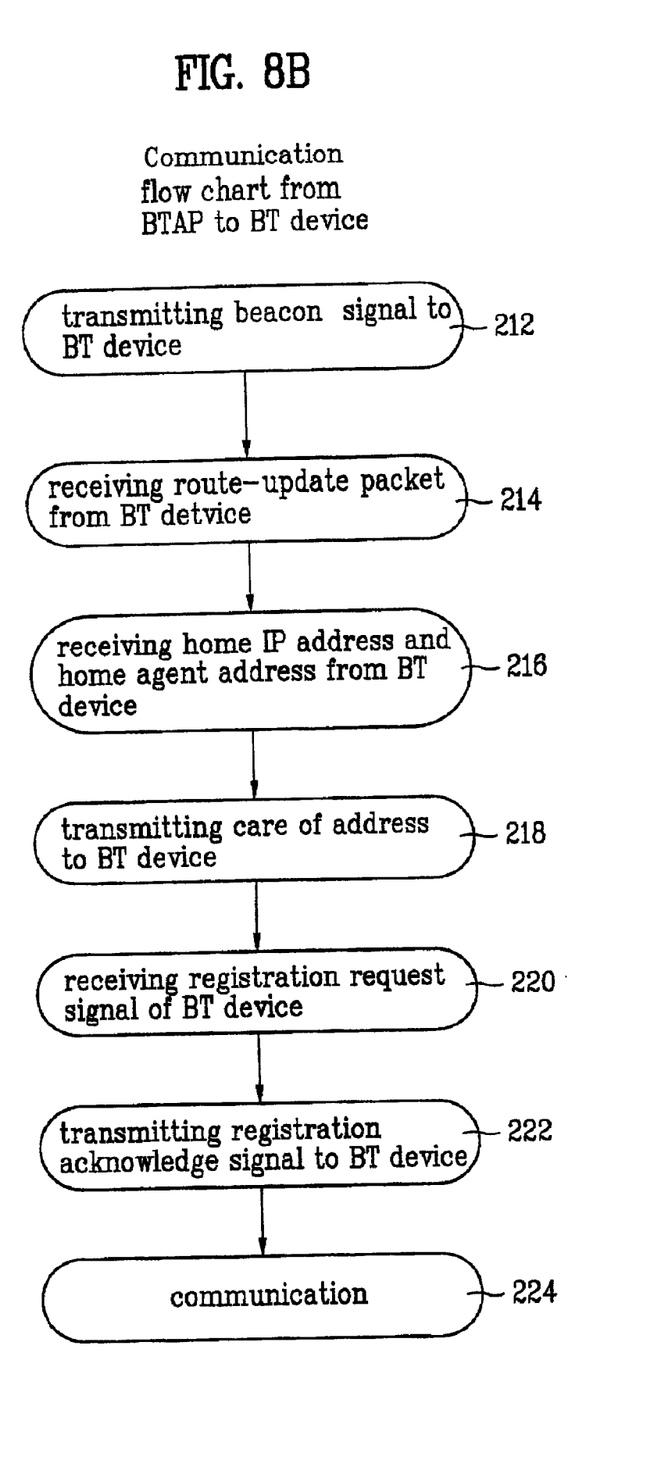
Figure 8C:
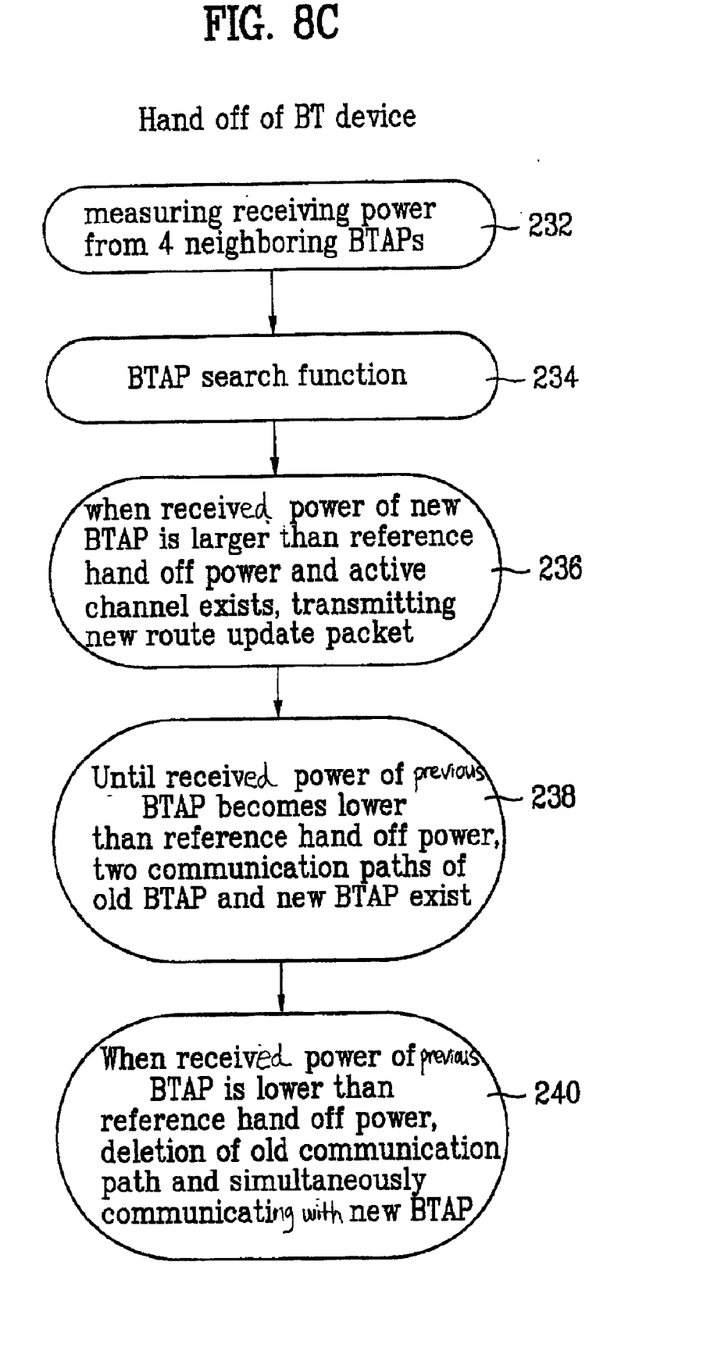

FIGS. 8A to 8C illustrate functional flow charts of the Bluetooth network according to the preferred embodiment of the present invention. FIG. 8A is a flow chart for the searching algorithm of the Bluetooth device. In step 202, the Bluetooth device uses the RSSI signal to search and located the nearest Bluetooth access point. Thereafter, the Bluetooth device communicates with the Bluetooth access point to determine whether there are any active channels.

FIG. 8B is a flow chart showing the communication between the Bluetooth device and the Bluetooth access point. In step 212, the Bluetooth access point transmits a beacon signal to a Bluetooth device. The Bluetooth device transmits a route update packet to the Bluetooth access point in step 214. The Bluetooth device also transmits a home IP address and a home agent address to the Bluetooth access point in step 216. Thereafter, the Bluetooth access point transmits the Care Of Address to the Bluetooth device in step 218. The Bluetooth device requests registration with the Bluetooth access point and the acceptance of registration is transmitted back to the Bluetooth device in steps 220 and 222. Thereafter, the Bluetooth device and the Bluetooth access point are in communication with each other in step 224.

FIG. 8C is a flow chart showing the handoff process of a Bluetooth device from one Bluetooth access point to another Bluetooth access point. In steps 232 and 234, the Bluetooth device receives and analyzes up to four RSSI signals received from four different Bluetooth access points. If a new Bluetooth access point's RSSI is above a predetermined level and at least one active channel is available at that Bluetooth access point, the Bluetooth device transmits a new route update packet to such Bluetooth access point in step 236.

Preferably, in step 238, until the previous Bluetooth access point's RSSI falls below the predetermined level, both the previous and the new Bluetooth access points are in communication with the Bluetooth device until complete handoff is achieved. However, if the previous Bluetooth access point's RSSI falls below the predetermined level, then the communcation path between the previous Bluetooth access point is disconneted and the communication with the new Bluetooth access point is achieved in step 240.

As described above, according to the private network via Bluetooth and the communication method thereof according to the invention, improvements have been made to solve the disadvantage of Bluetooth of the related art in which the mobility and the handoff cannot be supported so that various services such as voice, data, image information and the like can be provided from any the Bluetooth piconet.

The foregoing embodiments and advantages are merely exemplary and are not to be construed as limiting the present invention. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A Bluetooth private network for communicating with a public network, the Bluetooth private network comprising:
   a plurality of Bluetooth access points for functioning as base stations, each Bluetooth access point defining a Bluetooth piconet and interfacing between a signal transmitted from the public network and Bluetooth devices within each of Bluetooth piconets;
   a gateway interfacing between the public network and the Bluetooth private network, sending a beacon signal to each of the Bluetooth devices to locate the Bluetooth devices, and communicating with a home agent of each of the Bluetooth devices to perform authentication of the each of the Bluetooth devices;
   the Bluetooth device having a power measuring device therein that measures output power signals of a plurality of Bluetooth access points; and
   a router for functioning as an interface between each of said Bluetooth access points.

2. The Bluetooth private network of claim 1, wherein each one of the Bluetooth access points includes a routing cache for setting a path.

3. The Bluetooth private network of claim 1, further comprising an agent connected to the plurality of Bluetooth access points for performing IP address registration and authentication of the Bluetooth device.

4. The Bluetooth private network of claim 1, further comprising an application server connected to the plurality of Bluetooth access points for providing information requested by the Bluetooth device.

5. The Bluetooth private network of claim 1, wherein the output power signals of the plurality of Bluetooth access points are receiver signal strength indicators (RSSI).

6. The Bluetooth private network of claim 5, wherein the Bluetooth device measures up to four RSSIs from four Bluetooth access points to determine the strongest RSSI to select one of the four Bluetooth access points.

7. The Bluetooth private network of claim 5, wherein the Bluetooth device measures up to four RSSIs from four Bluetooth access points to determine one of the four Bluetooth access points that exceeds a predetermined RSSI level.

8. The Bluetooth private network of claim 3, wherein the output power signals of the plurality of Bluetooth access points are receiver signal strength indicators (RSSI).

9. The Bluetooth private network of claim 8, wherein the Bluetooth device measures up to four RSSIs from four Bluetooth access points to determine the strongest RSSI to select one of the four Bluetooth access points.

10. The Bluetooth private network of claim 8, wherein the Bluetooth device measures up to four RSSIs from four Bluetooth access points to determine one of the four Bluetooth access points that exceeds a predetermined RSSI level.

11. A Bluetooth private network, comprising:
   first and second Bluetooth access points, the first Bluetooth access point defining a first Bluetooth piconet, the second Bluetooth access point defining a second Bluetooth piconet;
   a gateway connected to the first and the second Bluetooth access points and sending a beacon signal to a Bluetooth device in the first Bluetooth piconet;
   the Bluetooth device having a power measuring device therein that measures first and second power strength signals from the first and the second Bluetooth access point, respectively, wherein the Bluetooth device periodically compares the first and the second power strength signals with a predetermined power level; and
   a router connected to the first and the second Bluetooth access points for functioning as an interface between each of said Bluetooth access points.

12. The Bluetooth private network of claim 11, wherein the Bluetooth device measures the first and the second power strength signals in a time division manner.

13. The Bluetooth private network of claim 11, wherein the Bluetooth device has a plurality of power measuring devices to concurrently measure a plurality of power strength signals from multiple Bluetooth access points.

14. The Bluetooth private network of claim 11, further comprising a home agent, wherein the gateway communicates with the home agent of the Bluetooth device to perform authentication of the Bluetooth device.

15. The Bluetooth private network of claim 11, wherein each one of the first and the second Bluetooth access points includes a routing cache for setting a communication path.

16. The Bluetooth private network of claim 11, further comprising an agent connected to the first and the second Bluetooth access points for performing IP address registration and authentication of the Bluetooth device.

17. The Bluetooth private network of claim 11, further comprising an application server connected to the first and the second Bluetooth access points for providing information requested by the Bluetooth device.

18. A communication method in a Bluetooth private network, the method comprising the steps of:
   (a) transmitting from a gateway a beacon signal to a Bluetooth device for confirming a first piconet to which the Bluetooth device belongs;
   (b) upon receiving the beacon signal, transmitting from the Bluetooth device a route update packet to the gateway to set a communication path with the gateway;
   (c) transmitting from the Bluetooth device a home IP address and a home agent address to the gateway;
   (d) upon receiving a registration request signal in the step (c), allocating from the gateway an address to the Bluetooth device to use the address in the piconet to which the Bluetooth device currently belongs;
   (e) registering in the gateway with the address transmitted in the step (d); and
   (f) when registered in the step (e), communicating from the Bluetooth device with other communication device in other network through the path set in the step (b).

19. The communication method of claim 18, wherein if the Bluetooth device is moving into a second piconet in said step (f), the method further comprising the steps of:
   (g) comparing a transmission power signal from a Bluetooth access point of the first piconet with a transmission power from a Bluetooth access point of a second piconet to determine a movement from the first to the second piconet;
   (h) if it is determined that there is movement from the first to the second piconet, transmitting a data packet to the Bluetooth access point of the Bluetooth access point belonging to the first piconet and transmitting a route update packet to the Bluetooth access point belonging to the second piconet to set a new communication path; and
   (i) if the new communication path is set in the step (h), transmitting a data packet to the Bluetooth access point of the second piconet.

20. The communication method of claim 18, wherein the path set in the step (b) is stored in a Bluetooth access point routing cache.

21. The communication method of claim 18, wherein the step (e) includes the steps of:
   upon receiving the registration request signal, transmitting from the gateway the registration request signal and an address allocated to the Bluetooth device to the home agent of the Bluetooth device which requested registration; and upon receiving the address, transmitting from the home agent a registration permission signal to the gateway, and sending from the gateway the transmitted registration permission signal to the Bluetooth device.

* * * * *